Patented Feb. 7, 1950

2,496,440

UNITED STATES PATENT OFFICE 2,496,440

MULTIWEB BONDED PAPER PRODUCTS

George V. Caesar, Staten Island, N. Y., and Jordan V. Bauer, Elmwood Park, and Don M. Hawley, Geneva, Ill., assignors to Stein, Hall & Company, Inc., New York, N. Y., a corporation of New York No Drawing. Original application June 17, 1943, Serial No. 491,228. Divided and this application November 14, 1946, Serial No. 709,800

5 Claims. (Cl. 154—141)

The present application is a division of our application Serial No. 491,228, filed June 17, 1943, now Pat. No. 2,463,148, issued March 1, 1949, which in turn, is a continuation-in-part of our application Serial No. 408,090, filed August 23, 1941, now abandoned.

The invention relates to the manufacture of paper products and, more particularly, to the manufacture of paper board on high speed bonding machines from a plurality of paper plies which are joined together by an adhesive bond which is resistant to water dissolution. The invention also includes the potentially water-proof adhesive utilized in the method of the invention, and the resultant paper product.

Two principal classes of paper board to which the invention particularly relates are termed laminated and corrugated paper board. Laminated paper board is produced commercially by adhesively combining two or more smooth surfaced strips of paper in a continuous process. The manufacture of corrugated paper board is similar, except that at least one of the strips of paper is corrugated and is joined to the adjacent strip or strips of paper only at the tips of the corrugations.

In carrying out the manufacture of both laminated and corrugated paper board on high speed bonding machines, the strips of paper to be adhesively joined are fed continuously, for example, from supply rolls. When the product to be made is laminated paper board, adhesive is applied mechanically, for example by means of applying rolls, to the surfaces to be joined as the paper strips are received from the supply roll, and thereafter the surfaces are brought together by means of guides and are subjected to heat to set the adhesive. When the product to be made is corrugated paper board, one or more of the paper strips received from the supply rolls first is corrugated, for example, by passing the strip between heated intermeshing fluted rolls. If desired, the paper strip to be corrugated may first be passed between steam jets to moisten and soften the paper, thus facilitating the corrugating operation. After the corrugating of the paper strip has been accomplished, adhesive is applied only to the tips of the corrugations before the corrugated strip is brought into contact with one or more flat strips to be bonded therewith.

Commercial bonding apparatus for continuously joining strips of paper to form laminated or corrugated paper board are designed to operate at a high rate of speed, for example, between 175 and 325 feet of paper board per minute. The use of such high speeds greatly limits the choice of adhesives which may be utilized commercially.

For example, it will be apparent that the adhesive must have suitable viscosity and other characteristics so that it may be applied to the paper strips mechanically at a high rate of speed. These characteristics must be readily controllable and relatively stable. Any thickening of the adhesive in the mixing vats or supply tanks, of course, would have serious consequences, possibly resulting in a failure of the process.

At the high rates of speed utilized, it is not feasible to apply considerable pressure to the paper plies during the bonding operation. This is particularly true in the case of corrugated paper board, because of the danger of crushing the corrugations. As a result, poor contact between the plies to be bonded may frequently occur. Accordingly, it is necessary that the adhesive have sufficient viscosity so that it will "stand up" on the surface of the paper and fill in any areas of poor contact while at the same time wetting the paper sufficiently to form a good bonding zone.

Also, as a direct result of the high rates of speed utilized, the heating and setting of the adhesive must be accomplished in a brief period of time. The heating zone employed is generally of the order of about 18 to 45 feet in length, whereby the paper board at a normal production rate of about 175 to 325 feet per minute, is subjected to heat for a period of only about 10 to 30 seconds. In the space of these few seconds, it is not necessary for the adhesive to become completely dry, but it is essential that a sufficiently strong bond be formed so that the paper board may be immediately cut and handled. In the bonding of corrugated paper board, quick setting is particularly essential to overcome any tendency of the plies to separate due to poor initial contact resulting from the inability to apply pressure during the setting operation.

For many years the only adhesives of commercial importance used in this type of operation were silicate of soda adhesives. It was found that silicate of soda adhesives having desired viscosity properties for use in the process could be prepared, and that these adhesives undergo a relatively rapid increase in viscosity as a result of a relatively small decrease in moisture content. As a result, the slight amount of heating occurring in the bonding operation would evaporate sufficient moisture, even though slight in amount, to form the desired adhesive bond. Silicate of soda adhesives, however, have not been entirely satisfactory because the resulting adhesive bond is relatively brittle and thus is easily broken during use. Moreover, the silicate of soda would form hard deposits on the rolls and other equipment, causing excessive wear, and scoring of the paper strips, and necessitating frequent cleansing of the apparatus.

More recently, an improved adhesive has been developed which has overcome many of the disadvantages of silicate of soda adhesives, comprising an ungelatinized starch component in an aqueous carrier. The setting of this adhesive is accomplished primarily by the gelatinization of the ungelatinized starch component upon the application of heat, whereby a rapid increase in the viscosity resulting in a strong bonding action takes places.

It is a disadvantage of the foregoing types of adhesives, however, that they both are water-soluble. Any moisture which might enter between the paper plies tends to dissolve the adhesive or decrease the adhesive strength sufficiently to result in failure of the bond and permitting the plies to separate. As a result, the paper board may be used satisfactorily only under relatively dry conditions, and cannot be permitted to stand in moisture of a relatively humid atmosphere without coming apart or having its strength seriously affected.

In accordance with the present invention, however, it is possible to manufacture paper board at the desired high rate of speed utilizing an adhesive which may have all the desirable properties of the starch adhesives described above, but which at the same time may provide a substantially waterproof adhesive bond between the paper plies, whereby a paper board having greater usefulness may be produced.

The adhesive which it is preferred to use in accordance with the invention comprises in critical proportions ungelatinized starch, a mixture of a water-soluble condensation product of formaldehyde and urea, and an aqueous carrier.

As used herein, the term ungelatinized starch or ungelatinized amylaceous material refers to ungelatinized starch and ungelatinized amylaceous material as such, and also to one or more ungelatinized starch components contained in starch-containing substances, said ungelatinized starch and ungelatinized amylaceous material being in the form of its natural unhydrated granular units, and said ungelatinized starch and ungelatinized amylaceous material being capable of gelatinizing with water upon being subjected to heat, irrespective of any preliminary treatment, and which impart little or no adhesive properties and viscosity until subjected to gelatinization by heating. It is only necessary that there be such a proportion of ungelatinized starch components present in the potential adhesive as to provide the necessary effective increase in viscosity upon the application of heat in situ to form an effective bond. For example, certain ungelatinized starch gums might ordinarily be considered as a converted material. However, the ungelatinized starchy components present in such gums are available and effective to give the desired bonding action in situ as described herein. Among the readily available materials which it may be preferred to utilize are, for example, the starch products derived from root or cereal sources, such as tapioca flour, cannaroot, arrowroot, potato, and corn or rice flours. In general, it is preferred, although not essential, to utilize an ungelatinized starch material which is comparatively free from gluten, or which has been modified, for example, by the addition of an anti-foaming agent or treatment with paraformaldehyde to overcome the foaming effect of the gluten.

As stated above, the formaldehyde and urea may be present as a mixture or as a water-soluble condensation product or both. For convenience, the formaldehyde may be utilized in the form of a 37-40% water solution, known as Formalin. It generally is preferred to utilize about three parts by weight of Formalin to one part by weight of urea. This ratio may be varied, however, within the range of about 4 to 2 parts by weight of Formalin to one part by weight of urea. Particularly desirable results have been obtained by first partially condensing the formaldehyde and urea to form a water-soluble condensation product. Such products are well-known to one skilled in the art and need not be described in detail herein. For example, the water-soluble condensation product dimethylolurea is readily available commercially or easily may be prepared by the user, for example, in accordance with the technique of Einhorn and Hamburger, disclosed in Ellis' "The Chemistry of Synthetic Resins" (1935), at page 592.

The use of a critical amount of an aqueous carrier having desired dispersing, adhesive, viscosity and other qualities is important for carrying out a bonding operation on high-speed machines with the adhesive which includes ungelatinized starch and a mixture or reaction product of urea and formaldehyde. One function of the carrier is to prevent any undue separation or settling of the ungelatinized starch granules which are water-insoluble. The carrier also must have such characteristics that the adhesive will pick up evenly and well on the applicator rolls and will transfer readily to the paper to be bonded. It also is important that the carrier be sufficiently viscous to stand up on the surface of the paper after it has been applied and yet sufficiently fluid to effectively wet the surfaces to be bonded. As pointed out above, this feature is particularly critical in bonding corrugated plies because of the areas of poor contact resulting from the inability to apply pressure during the bonding operation. Finally, the carrier must be suitable for carrying out the foregoing functions while possessing a water content such that a rapid bonding action or setting will occur upon the gelatinization of the ungelatinized starch during the application of heat and without any substantial evaporation of the moisture during said heating step. Rapid setting of the adhesive also is of primary importance in the bonding of corrugated paper board by reason of the relatively smaller areas of contact between the plies and their joinder without the use of substantial pressure. It also is desirable that the carrier does not introduce any components into the adhesive which will have an undesirable effect upon the water resistance of the final bond.

A particularly desirable aqueous carrier which adequately meets all the requirements set forth above may comprise, for example, a gelatinized starch solution or dispersion preferably formed from starch which has been modified by oxidizing agents or other means, such as partial dextrinization, to bring the viscosity characteristics within the desired range. The carrier should be of such nature that it will impart to the finished adhesive a viscosity preferably within the range of 40 centipoises to 500 centipoises as determined by the Brookfield viscosity apparatus. Other hydrosol forming materials such as colloidal clays, alumina, gluten, dextrins, vegetable gums, gelatine and the like may be substituted in whole or in part for the gelatinized starch. All such hydrosol forming materials are well-known and the preparation of an aqueous carrier therefrom having desired viscosity and other characteristics in view of the present disclosure is within the skill of one versed in the art.

The mixing together of the ingredients described above to form the adhesive may be carried out in any convenient manner. For example, it may be preferred to first form the carrier portion described above, and thereafter mix in the remaining ingredients. To facilitate the dispersing of the remaining ingredients or base portion into the carrier portion, it has been found to be desirable, for example, to form a slurry of the base ingredients with water before adding them to the carrier portion. Any water utilized for this purpose in the base portion, of course, must be compensated for by a reduction in the water content of the carrier portion in substantially equal amount. Whatever method of mixing is utilized, the final adhesive should contain the following proportion of ingredients if the adhesive is to be suitable for the purpose specified:

(a) 15% to 85% by weight of total solids of ungelatinized starch, preferably about 50%
(b) 5% to 50% by weight of total solids of urea-formaldehyde condensation product (or equivalent urea and formaldehyde mixture), preferably about 25%,
(c) 5% to 75% by weight of total solids of gelatinized starch (or equivalent amount of other hydrosol forming material), preferably about 25%, and
(d) a ratio of water to solids within the range of about 4:1 to 1:1, preferably 2:1 to 3:1.

In order to facilitate the heat setting or bonding operation, it is preferred to add a small amount of an acid or acid reacting salt to the adhesive to bring it within a pH range of about 5 to 6.5. A pH of less than 5 generally is not preferred because an undesirable thickening of the adhesive in the mixing vats or supply tanks may occur. In general, any acid, acid reacting salt, or other acidic material may be utilized such as boric acid, acetic acid, sodium diacetate having the formula $2(CH_3COONa) \cdot 2(CH_3COOH) \cdot H_2O$, propionic acid, lactic acid, aluminum sulfate, ammonium chloride, aromatic acids, such as benzene sulfonic acid, phosphoric acid, sulfuric acid, hydrochloric acid, nitric acid, and other well-known acidic materials not specifically mentioned. In general, not more than about 10% or less of such acidic material will be sufficient to accelerate the heat setting or bonding to the desired extent without causing undue thickening of the adhesive on standing.

In order that the invention may be more readily understood, reference may be had to the following specific examples of adhesives which have been prepared and utilized successfully in accordance with the invention. These examples are given merely by way of illustration and are not intended to be a limitation upon the scope of the invention.

*Example I*

Carrier portion:

| | Grams |
|---|---|
| Tapioca flour (partially dextrinized) | 31.5 |
| Bentonite clay | 3.5 |
| Water | 280 |

This mixture was heated at a temperature of 180° F. until a homogeneous dispersion was obtained.

Base portion

| | | |
|---|---|---|
| Tapioca flour | grams | 280 |
| Dimethylol urea | do | 150 |
| Water | cc | 440 |
| Lactic acid | cc | 30 |
| Boric acid | gram | 10 |

The base portion was mixed together and then dispersed in the carrier portion by stirring.

*Example II*

Base portion

| | | |
|---|---|---|
| Urea-formaldehyde-starch product | grams | 280 |
| Water | cc | 440 |
| Lactic acid | cc | 30 |
| Hydrochloric acid | cc | 8 |

The urea-formaldehyde-starch product was prepared by mixing 50 lbs. of Formalin with 16.6 lbs. of urea and 1 lb. of barium hydroxide and allowing the mixture to stand while cooling for a period of about 1 hour. The resulting mixture was then mixed with 100 lbs. of a partially dextrinized white corn starch having a solubility of about 4% to 6% in water at 75° F., but which cooks to a rather heavy mixture with 4 parts of water per part of dextrine.

The carrier portion in which the base portion was dispersed was the same as in Example I.

*Example III*

Carrier portion

| | | |
|---|---|---|
| GH gum (heavy corn British gum) | grams | 100 |
| Water | cc | 250 |

This mixture was heated to a temperature of 180° F. while stirring for 10 minutes.

Base portion

| | | |
|---|---|---|
| Tapioca flour | grams | 280 |
| Dimethylol urea | do | 150 |
| Water | cc | 470 |
| Boric acid | grams | 25 |

The base portion was mixed together and then dispersed in the carrier portion.

*Example IV*

Base portion

| | | |
|---|---|---|
| Ungelatinized starch | grams | 140 |
| Dimethylol urea | do | 100 |
| Water | cc | 440 |
| Lactic acid | cc | 30 |
| Hydrochloric acid | cc | 8 |

The base portion was mixed together and then dispersed in the carrier set forth in Example I.

*Example V*

Carrier portion

| | Pounds |
|---|---|
| Chlorinated corn starch | 47 |
| Water | 300 |

The chlorinated corn starch was cooked to 180° F. with half the amount of water after which the mixture was diluted with the remainder of the water.

Base portion

| | Pounds |
|---|---|
| Corn starch | 83.5 |
| Dimethylol urea | 16.5 |
| Boric acid | 7.5 |

One hundred pounds of the base portion mixture was dispersed in the carrier portion.

Example VI

| Carrier portion | Parts |
|---|---|
| Corn starch | 15 |
| Chlorinated corn starch | 20 |
| Water | 280 |

The carrier portion mixture was cooked to 190° F. for about 10 minutes.

| Base portion | Parts |
|---|---|
| Treated rye flour | 140 |
| Dimethylol urea | 25 |
| Water | 440 |

The base portion was mixed together and then dispersed in the carrier portion.

The treated rye flour was prepared by heating rye flour to 300° F. for one hour with ½% paraformaldehyde.

In general, it is preferred to prepare the adhesive not too far in advance of its use so as to avoid any substantial inter-reaction of the components which may have deleterious effects on the adhesives. After prolonged standing, thickening of the adhesive may occur, and frequently the ungelatinized starch portion of the adhesive becomes less susceptible to swelling upon the application of heat, possibly because of a reaction taking place with the formaldehyde present.

The adhesives prepared in accordance with the invention as described above are found to pick up well on the applicator rolls and transfer readily to the plies or strips to be bonded. They also stand up well on the surfaces coated therewith and, at the same time, adequately wet the surfaces so as to insure a good bond. Upon being heated to an elevated temperature, for example, of the order of about 140° F. to 165° F. up to 400° F., rapid setting or bonding of the adhesive line takes place. This heating may be accomplished conveniently in operation with conventional type apparatus by passing the coated strips or plies, either immediately before or after the strips or plies are brought together in the position in which they are to be bonded, across a hot plate which may be heated to a temperature, for example, of 250° F. to 375° F. or higher. A rapid setting or bonding of the adhesive takes place substantially independently of any moisture loss due to evaporation.

The laminated or corrugated paper products following the heating step are found to be sufficiently well bonded to be subjected immediately to cutting, scoring and other handling operations. The adhesive line or bond, moreover, has developed a substantial resistance to water dissolution so that the bonded plies or strips will not separate or fail at the glue line when brought into contact with moisture. This advantage may be enhanced by also treating the plies or strips to render them water-resistant, inasmuch as said treatment, in general, will not interfere with the bonding operation.

While it is not intended to limit the invention to any particular theory of operation, it may assist in the understanding of the invention to state that it is believed that upon the application of heat, the ungelatinized starch portion of the adhesive undergoes gelatinization during which water is taken up by the starch causing an immediate viscosity increase and bonding action. At the same time, it is believed that the urea and formaldehyde combine chemically with the starch to form a water-resistant compound.

For facility and simplicity of illustration, the invention has been described particularly in connection with the manufacture of paper board, but this has been done merely for convenience as it will be apparent that similar processes may be employed in combining webs of other fibrous material, such as cloth with paper, or cloth with cloth.

All modifications or variations to which the invention is susceptible by one skilled in the art are intended to be included within the scope of the invention.

We claim:

1. An article of manufacture comprising a plurality of webs of fibrous material joined together by a water-resistant bond, said bond being an adhesive composition comprising 15% to 85% by weight of total solids of starch gelatinized in situ, 5% to 50% by weight of total solids of urea-formaldehyde resin and 5% to 75% by weight of total solids of hydrosol forming materials.

2. A paper board comprising a plurality of paper plies joined together by a water-resistant bond, said bond being an adhesive composition comprising 15% to 85% by weight of total solids of starch gelatinized in situ, 5% to 50% by weight of total solids of urea-formaldehyde resin and 5% to 75% by weight of total solids of hydrosol forming materials.

3. A corrugated paper board comprising a corrugated paper core joined at the tips of the corrugations to a plurality of paper plies by a water-resistant bond, said bond being an adhesive composition comprising 15% to 85% by weight of total solids of starch gelatinized in situ, 5% to 50% by weight of total solids of urea-formaldehyde resin and 5% to 75% by weight of total solids of hydrosol forming materials.

4. An article of manufacture comprising a substantially flat web of fibrous material and a corrugated web of fibrous material joined together by a water-resistant bond, said bond being an adhesive composition comprising 15% to 85% by weight of total solids of starch gelatinized in situ, 5% to 50% by weight of total solids of urea-formaldehyde resin and 5% to 75% by weight of total solids of hydrosol forming materials.

5. An article of manufacture comprising a plurality of webs of fibrous material joined together by a water-resistant bond, said bond being an adhesive composition comprising 15% to 85% by weight of total solids of starch gelatinized in situ, 5% to 50% by weight of total solids of urea-formaldehyde resin and 5% to 75% by weight of total solids of pre-gelatinized starch.

GEORGE V. CAESAR.
JORDON V. BAUER.
DON M. HAWLEY.

REFERENCES CITED

The following references are of record in the file of this patent:

UNITED STATES PATENTS

| Number | Name | Date |
|---|---|---|
| 2,102,937 | Bauer | Dec. 21, 1937 |
| 2,141,313 | Osgood | Dec. 27, 1938 |
| 2,275,314 | Pierson | Mar. 3, 1942 |
| 2,302,309 | Glarum | Nov. 17, 1942 |
| 2,302,310 | Glarum | Nov. 17, 1942 |
| 2,322,887 | Schwartz | June 29, 1943 |
| 2,385,714 | La Piana | Sept. 25, 1945 |